(12) United States Patent
Oldenburg et al.

(10) Patent No.: US 9,753,758 B1
(45) Date of Patent: Sep. 5, 2017

(54) BUILDING OF VIRTUAL SERVERS IN A CLOUD VIA NON-STRUCTURED STRINGS

(71) Applicant: Sprint Communications Company L.P., Overland Park, KS (US)

(72) Inventors: William O. Oldenburg, Fort Worth, TX (US); Christopher S. Saunderson, Kansas City, MO (US); Jeffrey L. Torchia, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 92 days.

(21) Appl. No.: 14/956,275

(22) Filed: Dec. 1, 2015

(51) Int. Cl.
*G06F 9/455* (2006.01)
*H04L 12/24* (2006.01)

(52) U.S. Cl.
CPC ...... *G06F 9/45558* (2013.01); *H04L 41/0806* (2013.01); *G06F 2009/4557* (2013.01); *G06F 2009/45562* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,825,858 B1 | 9/2014 | Atchity et al. | |
| 9,258,252 B1 | 2/2016 | Atchity et al. | |
| 2008/0294808 A1* | 11/2008 | Mahalingam | G06F 13/105 710/26 |
| 2009/0147700 A1* | 6/2009 | Sewall | H04L 41/0253 370/254 |
| 2011/0134793 A1* | 6/2011 | Elsen | H04L 12/462 370/254 |
| 2014/0372579 A1* | 12/2014 | Kikuchi | H04L 41/0806 709/222 |
| 2016/0105393 A1* | 4/2016 | Thakkar | H04L 41/0823 709/220 |
| 2017/0005990 A1* | 1/2017 | Birger | H04L 63/045 |

* cited by examiner

*Primary Examiner* — Charlie Sun

(57) ABSTRACT

A system for building virtual servers via non-structured strings is disclosed according to an embodiment. The system comprises a build server that is configured by execution of an application on a processor to obtain, from a ticketing system, server design data having non-structured strings. The system determines that the server design data does not designate a primary virtual network interface controller based on the non-structured strings, and isolates, via the non-structured strings, an interface type parameter and an interface alias parameter for each of a plurality of virtual network interface controllers. Responsive to the determination, the system generates an interface metric for each of a plurality of virtual network interface controllers. The primary network interface is automatically determined by the system based on one of the interface metrics corresponding to one of the plurality of virtual network interface controllers.

20 Claims, 9 Drawing Sheets

BUILDING OF VIRTUAL SERVERS IN A CLOUD VIA NON-STRUCTURED STRINGS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual servers allow the sharing of underlying physical machine and network resources. Communication service providers may desire to build new servers through virtualization to allow for maximum processing efficiency on a communications network for cloud computing. Virtualization promotes network segmentation, more flexible maintenance, processing resource availability, and disaster recovery on the network. Instead of using a separate physical computer for each new server, a plurality of virtual servers may execute and share physical computer resources in a managed network environment.

SUMMARY

In an embodiment, a system for building virtual servers via non-structured strings is disclosed. The system comprises a build server coupled to host servers and a ticketing system via a network. The build server comprises a non-transitory memory storing an application that, upon execution, configures at least a processor of the build server to obtain, from the ticketing system, server design data having non-structured strings. The build server determines that the server design data fails to designate a primary virtual network interface controller, and isolates, via the non-structured strings, an interface type parameter and an interface alias parameter for each of a plurality of virtual network interface controllers. Responsive to determining the server design data fails to designate the primary virtual network interface controller, the build server generates an interface metric for each of the plurality of virtual network interface controllers. The build server then automatically determines the primary virtual network interface controller based on one of the interface metrics corresponding to one of the plurality of virtual network interfaces.

In an embodiment, a method is disclosed for building virtual servers via non-structured strings. The method comprises obtaining, by a build server comprising a processor configured by an application, server design data having non-structured strings from a ticketing system via a network. The method includes determining, by the build server, that the server design data fails to designate a primary virtual network interface controller. Then method also comprises isolating, by the build server via the non-structured strings, an interface type parameter and an interface alias parameter for each of a plurality of virtual network interface controllers. The method includes generating, by the build server, an interface metric for each of the plurality of virtual network interface controllers responsive to determining the server design data fails to designate the primary virtual network interface controller, and automatically determining, by the build server, the primary virtual network interface controller based on one of the interface metrics corresponding to one of the plurality of virtual network interfaces.

In an embodiment, a method is disclosed for building virtual servers via non-structured strings. The method comprises obtaining, by a build server executing an application stored in non-transitory memory that configures a processor, server design data directly from a ticketing tool of a ticketing system, where the server queue data has non-structured strings. The method includes determining, by the build server, that the server design data fails to designate a primary virtual network interface controller, and generating, by the build server, an interface metric for each of the plurality of virtual network interface controllers. The method comprises automatically selecting, by the build server, the primary virtual network interface controller based on one of the interface metrics corresponding to one of the plurality of virtual network interface controllers, and then the build server autonomously verifying that a virtual server can be built based on the primary virtual network interface controller.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
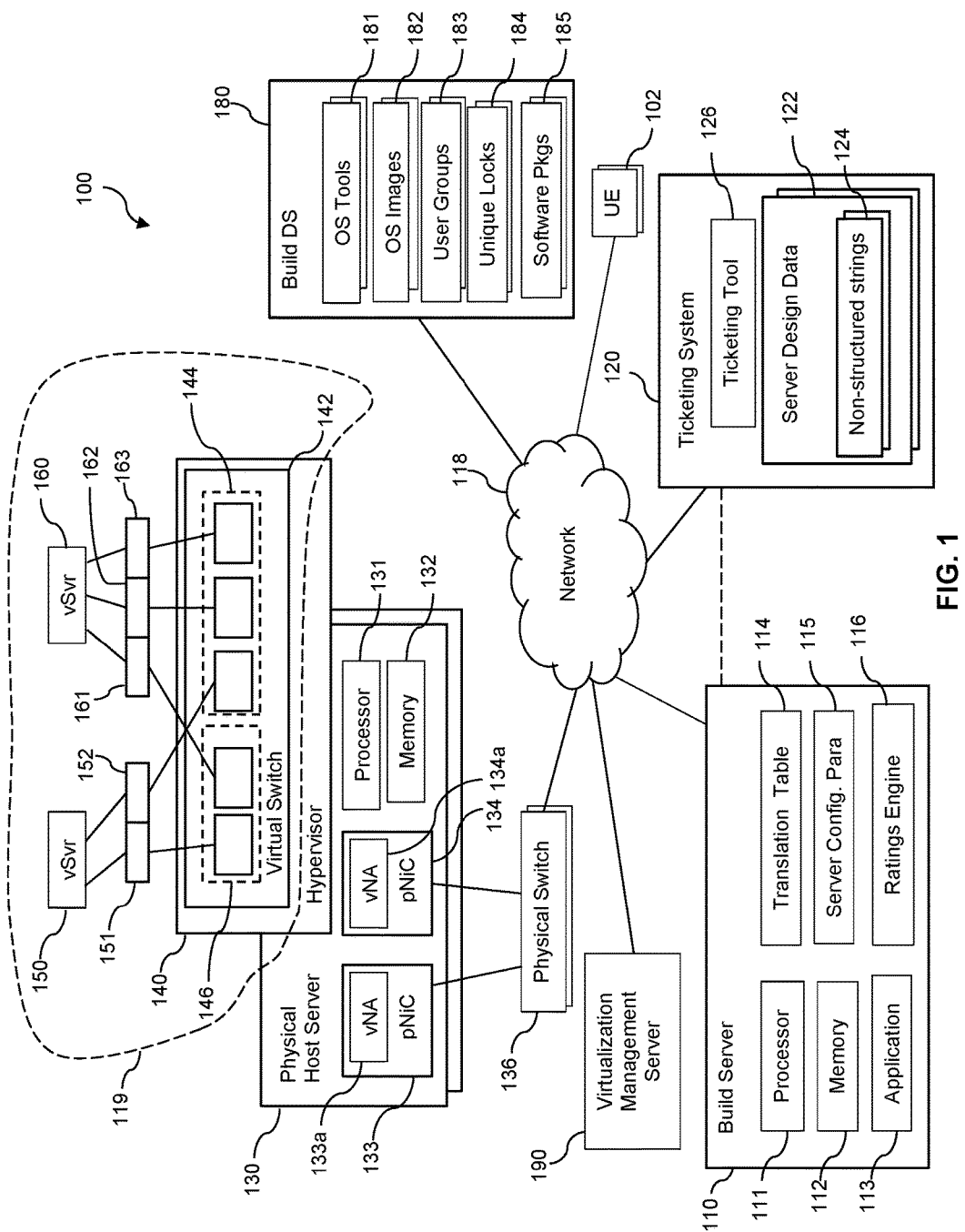
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communication service provider may manage a cloud computing environment—that is, a network of physical and virtual servers, computer systems, and data stores that provide the network resources to maintain the operations and functioning of telecommunications services. The network resources available to the service provider for implementing new functionality can be constantly in flux, thus making the allocation of resources challenging when building a server in the cloud. When an engineer would like to request that a new server be built (e.g., created by provisioning a physical server with parameters for operation), an embodiment of a conventional system may use input that conforms to structured text that includes hard-coded programming syntax or selectable pre-defined inputs in a portal used to generate a request. However, inputs based on structured text may not account for all available network resources or may not account for outstanding requests in a queue to build a different server. Attempts to build a new server, such as creating and provisioning a virtual server on a physical host server, based on requiring hard-coded inputs (e.g., structured data) conforming to syntax of programming languages may also waste processor runtime when the build fails for lack of processor or memory availability, lack of resource availability (such as ports already being allocated to a build of a different server), or lack of machine interoperability (such as differing operating systems, differing programming languages of machines involved, or differing software tools). Yet the use of non-structured strings (e.g., text, characters, symbols that are not pre-defined or uniformly arranged) presents challenges because these strings may have irregularities and ambiguities that make it difficult for generic computers to understand using conventional systems. Thus, when inputs include non-structured strings and/or contain incorrect syntax, do not designate certain parameters, or designate parameters that have already been allocated, it may increase the network traffic, decrease processing efficiency on the network, and may slow down the creation of new servers for implementation on a network for the service provider. This creates problems inextricably tied to computer technology—specifically when creating or verifying whether servers can be created for implementation in a network such as a cloud computing environment.

Accordingly, it may be desirable to provide a system that takes non-structured strings as input, through an organization's ticketing system, to build a new server, even when the non-structured strings do not designate all parameters needed to build the new server. For example, a ticketing system corresponds with an integrated platform and automated "help desk" (i.e., a particular, non-generic, computer system configured to receive, obtain, and handle data structures corresponding to input for outstanding requests) that contain input of non-structured strings stored in server design data. However, the server design data might not designate a primary virtual network interface controller for use by the new server. Without the designation of a primary virtual network interface controller, a virtual server may not be able to communication with other virtual or physical machines outside of the host server and incorrect designations may cause network connection faults. Thus, conventional systems may return errors which lead to wasted use of processing resources, decreased computing speeds, and possibly failure to create a virtual server that could operate in the designated network environment.

Embodiments of the present disclosure include a build server configured by an application that determines a primary virtual network interface controller despite the lack of designation. The build server generates an interface metric for virtual network interface controllers based on server design data having non-structured strings in order to designate which one will be the primary virtual network interface controller. This allows the build server to activate the determined primary network interface to push gateway and domain name service (DNS) settings that will be used to route traffic to and from the new virtual server. The build server can also use the server design data and non-structured strings to generate server configuration parameters that will be used to provision the new server. This allows the build server to autonomously generate a mapping of which software and tools should be installed on the new virtual server, as well as their installation order and dependencies on other hardware and software. The build server performs a verification that the a new virtual server could be built successfully in order to determine whether errors may occur with the build and thus reduce the likelihood that resources are consumed or wasted on an unsuccessful build. Thus, the systems and methods discussed herein solve technological problems inextricably tied to the realm of computers and improve the field of cloud computing and virtual servers.

Turning now to FIG. 1 a communication system 100 is disclosed. The communication system 100 may facilitate automated building of virtual servers through the use of non-structured strings. In an embodiment, the system 100 comprises network 118 which is coupled to one or more user equipment (UE) 102, build server 110, ticketing system 120, physical switch 136, one or more physical servers 130, build data store 180, and virtualization management server 190. The virtual network 119 is shown in dashed lines as being separate from network 118, however it is understood that at least some of virtual network 119 may be included in and interconnected with network 118, as further discussed below. At least one instance of UE 102 may access a console interface of an executing ticketing tool 126 that is configured to receive input that relates to design details about a new virtual server that is yet to be built. It is understood that UE 102 is a particular, non-generic, machine that is configured to connect with communication system 100, and embodiments of UE 102 are discussed in further detail with respect to FIG. 4 and FIG. 7.

The ticketing system 120 comprises ticketing tool 126, which may be a third-party application and integrated platform that serves as a help desk. The ticketing system 120 comprises a computer system that is configured for management of incidents, problems, changes and trouble tickets for computer resources in a network, while also automating and adapting the management of resources in the network. In some embodiments, ticketing system 120 may be referred to as a service manager. Because the ticketing tool 126 and ticketing system 120 operate as part of a help desk, it is not a provisioning database and thus may not be a conventional source of input for the build server 110 to reference when creating a new virtual server. The ticketing system 120 includes a database that stores server design data 122 in non-transitory memory. The server design data 122 may be generated by ticketing system 120 through the use of ticketing tool 126 based on input received from one or more UE 102. In some embodiments, UE 102 may execute ticketing tool 126 locally, or as a web service via a portal. The ticketing system 120 includes instances of server design data 122, where each instance is unique to a request by UE 102 having a corresponding user account with permissions and authentication keys. Each instance of server design data 122 corresponds with at least one unique identifier such as an email address and/or design details ticket number. The application 113 configures at least one processor (e.g., 111)

of build server 110 to obtain server design data 122 from ticketing system 120 via network 118. Thus, build server 110 may not have to wait for information in a corporate ticketing platform to replicate and be stored in a remote database. In an embodiment, build server 110 may be coupled directly with ticketing system 120 as illustrated by the dashed communication path in FIG. 1.

The server design data 122 comprises non-structured strings 124 corresponding to input from UE 102. The use of non-structured strings as software input presents challenges for conventional system that provision and create new servers because the non-structured strings may include irregularities and ambiguities that would not account for differing computer languages used by software tools in the sever build process. Non-structured strings may include information that at least partially does not have a pre-defined data model or is not consistent across data instances in a pre-defined manner. Non-structured strings 124 include text, such as characters, symbols, and/or values, and in some embodiments may be used to describe the general nature of the request without having to exactly match the syntax for each programming language that is used during the build of a new server. Non-structured strings 124 may allow for a more free-form input via UE 102 and does not have to be pre-defined by the service provider for selection through user equipment, thereby easing the task of inputting data associated with a new virtual server. For example, a selection from a drop-down menu or conforming to other pre-defined input is in contrast to non-structured strings 124 that may be input into a field of ticketing tool 126, where the non-structured strings 124 are not necessarily associated with the tag of the field. Thus, non-structured strings 124 of the server design data 122 may be received from UE 102 and correspond with user input that is not predefined in a drop-down menu. Non-structured strings 124 may include text that is human readable (i.e., at least partly understood by the engineers but not necessarily be uniformly understood by a generic machine for creating a server), yet lack uniformity across the different instances of server design data 122. It is understood that in some embodiments, some or all of the application 113 may be executed on build server 110 and run as a web service accessible by UE 102 via network 118.

The ticketing tool 126 may not have a designated field to indicate which of a plurality of virtual network interface controllers should be used as the primary (referred to as the primary virtual network interface controller). Thus, server design data 122 and corresponding non-structured strings 124 do not include or designate at least some specific parameters that may be needed to build or verify the build of a server, such as failing to designate the primary virtual network interface controller. Simply requesting the user to randomly designate the primary virtual network interface would not solve the problem for lack of designation because the user may not be privy to the impact of a random selection and an incorrect designation may cause network connectivity problems, slow down overall processor build-time, and may not account for resource allocations for concurrently running (or yet to be built) virtual servers (e.g., 150, 160). A virtual server (e.g., 160) may use a designation of a primary virtual network interface controller (e.g., 161) in order to connect with other particular machines on a network, such as network 118 that may include some or all of virtual network 119.

To determine which virtual network interface controller should be configured to be the primary network interface in the server being built, the build server 110 may determine whether a non-structured string 124 is associated with one of a plurality of virtual network interface controllers (e.g., any of 151, 152, 161, 162, 163). In an embodiment, the build server 110 creates a translation table 114 in memory 112 to place the server design data 122 comprising the non-structures strings 124, and using the translation table 114, the application 113 parses the server design data 122. The application 113 determines that at least some of the non-structured strings 124 are associated with one of a plurality of virtual network interface controllers and may generate an interface metric in order to determine the primary virtual network interface controller. The application 113 may configure build server 110 to call a ratings engine 116 to generate an interface metric for each of the plurality of virtual network interface controllers. Generation of an interface metric may be in response to determining the server design data 122 fails to designate the primary virtual network interface controller and/or may be based on at least one of an interface type parameter and interface alias parameter. A particular combination of parameters extracted from the non-structured strings 124 may trigger the ratings engine 116 to assign a particular interface metric value for a corresponding virtual network interface controller. The virtual network interface controller having the interface metric with the highest value may be made the primary.

For example, in an embodiment the application 113 may take the non-structured strings 124 and isolate an interface type parameter and an interface alias parameter for each corresponding virtual network interface controller. Each virtual network interface controller has its own interface type parameter and interface alias parameter. The interface type parameter includes values and/or characters that represent the type of services and/or connection that the network interface is intended to be used for by a virtual server. For example, an interface type parameter may include syntax corresponding to "enterprise", "bulk", "test", or some other indicator of the connection. The interface alias parameter includes values and/or characters that represent the name given to the virtual network interface controller. An interface alias that matches the name of the physical host server may trigger a higher value to be generated and assigned to the interface metric for the corresponding virtual network interface controller.

Continuing in FIG. 1, the build server 110 may determine that virtual network interface controller 161 should be the primary from among the plurality of virtual network interface controllers 161, 162, 163 when virtual server 160 is built, and similarly may determine that virtual network interface controller 152 should be primary over interface 151 for virtual server 150 when it is built. It is understood that the non-structured strings 124 may not exactly match the exact syntax of "enterprise" or "hostname" identified by the rules in the ratings engine 116 used to assign value to the interface metric, but rather the application 113 may use translation table 114 to interpret the non-structured strings 124 and determine the appropriate correlation. Such as the string of "ent1", "ent", "ENTR" may all correspond to "enterprise". In an embodiment, the build server 110 generates an interface metric having values based on the combination of an interface type parameter being "enterprise" and an interface alias parameter being the same as the hostname of the server and thus set to "hostname".

Consider the following example, if the interface type parameter is determined by build server 110 to correspond to "enterprise" and the interface alias parameter corresponds to "hostname", then this combination would yield an interface metric having a value of "4". If the build server 110 determines that the interface type parameter is given and corresponds to "enterprise", but the interface alias does not correspond to "hostname", then the interface metric for this combination would have a value of "3". If the interface alias parameter is determined to correspond to "hostname" and the interface type parameter does not correspond to "enterprise", then the interface metric for this combination would have a value of "2". If the interface type parameter corresponds to "bulk" and the interface alias parameter does not correspond to "enterprise", then the interface metric for this combination would have a value of "0" (zero). For all other interface alias parameters and interface type parameters that do not reflect the combinations of "hostname" or "enterprise" as discussed in this embodiment, the build server 110 may assign the virtual network interface controller an interface metric with a value of "1".

The build server 110 may compile a list of all the interface metrics given to each virtual network interface controller under consideration, and designate the virtual network interface controller with the highest interface metric value (e.g., based on a particular combination of interface type parameter and interface alias parameter) as the primary virtual network interface controller. Thus, the primary virtual network interface controller is determined based on one of the interface metrics corresponding to one of the plurality of virtual network interfaces.

To clarify how build server 110 is configured by application 113 to build a virtual server (e.g., 150, 160) or verify that one or more could be built, a discussion of the interactions of the particular machines involved is in order. Embodiments of the present disclosure include the operation and creation of virtual machines, such as virtual servers 150, 160 illustrated in FIG. 1. Virtual servers (e.g., one of 150, 160) reside and are built on top of physical hardware that include one or more physical particular machines. The operation and creation of virtual servers may reduce hardware expenses and may improve the functioning of a network by isolation and protection from the underlying physical resources. Each virtual server 150, 160 may be isolated from one another and can be viewed by other machines on a network as having dedicated physical hardware even though the physical hardware resources (e.g., memory, processors, etc.) may be reallocated or dynamically adjusted among virtual machines using a virtualization management server 190. The virtualization management server 190 may be configured to monitor hardware allocations for virtual servers 150, 160 and to provide information about physical host servers (e.g., 130) to the build server 110.

In some embodiments the virtualization management server 190 and/or build server 110 can transfer a currently running virtual server from one physical host server to another to manage the processing "load" on a network (e.g., 118, 119). The build server 110 may couple directly and/or indirectly (e.g., via network 118) with virtualization management server 190 to receive information about the current state of physical host servers (e.g., at least 130), receive information about virtual servers that may currently be in operation on the respective physical host servers and information about their corresponding resource allocation and availability. The virtualization management server 190 may be configured to manage and report the allocation of memory and processing capacity of physical host servers (e.g., 130), along with the commitments, allocations, and availability of other hardware and/or software resources across the communication system 100. The virtualization management server 190 may include embodiments that are discussed in further detail in U.S. patent application Ser. No. 12/939,742, filed Nov. 4, 2010, entitled "Virtual Server Resource Monitoring and Management," by Gregory J. Atchity, et. al., which is herein incorporated by reference in its entirety.

Network 118 may include a public network, private network, virtual network (e.g., virtual network 119), or any combination thereof. The network 118 may include network nodes, access points, enhanced node B's, home location registers, server farms, and other equipment that may be used in a cloud computing environment. The virtual network 119 may be an emulation of a physical network and be interconnected with the machines in the physical realm on network 118 via a virtual machine monitor (e.g., hypervisor 140), corresponding virtualized components (e.g., virtual switch 142), and one or more network node (e.g., physical switch 136).

The build server 110 may be configured by application 113 to recognize a build flag in the server design data 122. In an embodiment, a build flag corresponds with permission to build a virtual server (referred to as build mode) or only verification as to whether a virtual server could be built, which may be referred to as "precheck" or "precheck mode". When a build flag corresponds with build mode, a unique lock may be implemented for a target hypervisor, which is the hypervisor that will be used for building and operating the virtual server. This ensures that only one set of provisioning automation will be run against the hypervisor (e.g., 140) at a time. For example, build server 110 may determine that a build flag in server design data corresponds with permission to build a virtual server 160. Responsive to this determination, application 113 may configure build server 110 to access build data store 180 and retrieve one of the unique locks 184 from non-transitory memory, where the unique lock retrieved may be associated with the target hypervisor, which for virtual server 160 would be hypervisor 140. Implementation of a unique lock (e.g., one of unique locks 184) may prevent creation of other virtual servers against (i.e., using) the target hypervisor during the build of virtual server 160. A unique lock may be implemented against the target hypervisor prior to and during the virtual server (e.g., 160) being built. In an embodiment, this may allow for the build server 110 to generate server configuration parameters 115 while reserving resources corresponding to the server configuration parameters 115. Thus, the virtual server (e.g., 160) can be built based on the server configuration parameters and the primary virtual network interface via the target hypervisor without another build process attempting to use the same resources concurrently, which could possibly lead to an error or system crash. Before discussing the generation of server configuration parameters 115, the use of hypervisors, such as 140, will be discussed.

A hypervisor (e.g., 140) comprises a software platform that sits in between the virtual machines (e.g., virtual servers 150, 160) and physical infrastructure (e.g., physical host server 130, physical switch 136, etc.) and configures particular host machines to provide the virtual machines with their allocated and/or designated virtual resources (e.g., virtual processors, virtual memory, virtual network interface controllers, virtual storage, virtual I/O devices, etc.). The virtual switch 142 may be executing via the hypervisor 140 and use the physical network interface controllers (e.g., 133, 134) associated with the physical host server 130 to connect the virtual network 119 to the physical network (e.g., 118). In some embodiments, physical network interface controllers may be referred to as uplink adapters. Each physical network interface controller 133, 134 may comprise and use virtual objects called virtual network adapters 133a, 134a respectively, to interface with the virtual switch 142. Once the virtual switch 142 has bridged the connection between the virtual network 119 and the physical network (e.g., 118), the virtual servers already residing (or that will be built to reside) on the physical host server 130 can begin transferring data to, and receiving data from, all of the network-capable devices connected to the physical network 118. That is to say, the virtual servers 150, 160 (once built) are not limited to communicating solely across the virtual network 119. The build application 113 and/or hypervisor 140 may create a virtual network (e.g., 119) from a virtual switch 142 mapped to one or more physical network interface controllers 133, 134, or mapped to no physical network interface controllers at all—which would limit the connectivity to only the virtual servers mapped to the virtual network.

To connect to virtual switch 142, build server 110 may be configured by application 113 to map a virtual network interface controller to the virtual server (e.g., 150, 160). Similar to physical network interface controllers 133, 134, a virtual network interface (e.g., one of 151, 152, 161, 162, 163) may be configured with specific network settings, a MAC address and/or an IP address. As mentioned above, each virtual server 150, 160 may correspond with a primary virtual network interface controller (e.g., 151, 161) respectively. In an embodiment, the primary virtual network interface controller (e.g., 161) is the virtual network interface controller that receives the default and only gateway for the virtual server (e.g., 160). This means that the virtual server may use any virtual network interface controller to connect to virtual and physical machines that are directly connected to the same network as the virtual network interface controller, but the virtual server can only use the primary virtual network interface controller to connect to machines on networks that are accessed via a gateway connection. This means that the primary virtual network interface controller 161 may be the one that is automatically fed (via the application 113) the gateway settings, domain name system (DNS) settings, an IP address, and a subnet mask, which are settings specified by the server configuration parameters 115 that may result in a correct and working network configuration for the virtual server 160. Virtual network interface controllers that are not the primary (for example 162, 163 determined not to be the primary) may be pushed only an IP address and subnet mask, but (in some embodiments) they are not pushed DNS settings or gateway settings for use in a gateway connection. This means the primary network interface controller would be the only interface controller given authorization to interact with machines outside virtual network 119.

Thus the virtual server 160 accesses machines outside virtual network 119 via the primary virtual network interface controller 161. Once virtual server 160 is built, the application 113 may validate that the virtual server 160 is accessible to machines outside of the physical host server 130 and/or virtual network 119 only via the primary virtual network interface controller 161. The application 113 may validate this by attempting to access virtual server 160 via the non-primary virtual network interface controllers (i.e., 162, 163) and verifying that access attempts are denied from outside the physical host server 130 and/or virtual network 119.

Each virtual server 150, 160 interfaces with the virtual switch 142 via a virtual port. Virtual switch 142 may comprise one or more port groups (e.g., port group 144, 146). A port group 144, 146 may be given an alias such as "test", "production", or "development", and each port group 144, 146 may describe how the virtual switch 142 should route traffic between the virtual network 119 and the virtual servers 150, 160 connected to the specified ports in their port groups. Port groups 144, 146 may be defined to configure traffic shaping and bandwidth limitations, network interface controller failover, and other network settings. In some embodiments, virtual switch 142 can be assigned to more than one physical host server at a time and may define inbound and/or outbound traffic shaping. In an embodiment, traffic shaping may comprise regulating network data transfer to assure a certain level of performance, quality of service, and/or scheduling for later transmission.

A build server 110 may be configured to identify a target hypervisor—that is, the hypervisor that should be used in the build and operation of a virtual server. The target hypervisor that should be used may be identified by the build server 110 based on one or more of the determined primary virtual network interface controller, the hypervisor type, compatibility with the physical host server, a target datacenter, a target pool name (name of intended resource pool), server design data 122, or any combination thereof. A datacenter combines the compute and memory resources of a single resource pool with the storage resources of one or more datastores available to that resource pool. A resource pool includes a division of computing resources of physical host servers (e.g., at least 130) used to manage allocations between virtual machines. The target datacenter corresponds to a data structure configured by application 113 under which hosts (e.g., physical host server 130) and their associated virtual machines (e.g., 150, 160) are added to a hypervisor (e.g., 140), and the hypervisor 140 may support multiple datacenters. In some embodiments, a physical host server (e.g., 130) may be managed under only one datacenter. The application 113 may receive the maximum CPU count (associated with processing capacity and processing threshold) and maximum memory size that is associated with the maximum size of server that a particular hypervisor can support, such as hypervisor 140—which in FIG. 1 is the target hypervisor. Information about the target hypervisor may be retrieved from build datastore 180 or another memory by application 113 and/or via virtualization management server 190.

The hypervisor instance that will be used to build the virtual server (e.g., 150, 160) may be referred to as the target hypervisor, and may be based on the target datacenter and target pool name that is determined from non-structured strings 124 of server design data 122. In some embodiments, there may be different hypervisor types and a plurality of different hypervisor instances supporting multiple server farms. The target hypervisor may be determined and/or instantiated by the build server 110 from among a plurality of target hypervisor instances stored in a repository, with each hypervisor instance corresponding to a hypervisor type, such as type-1 or type-2. In some embodiments, hypervisor 140 has a type-1 hypervisor architecture, occasionally referred to as a bare metal hypervisor. A bare metal hypervisor is configured to run directly on the host server's hardware where there is no pre-existing operating system installed on the host server and thus the bare metal hypervisor provides driver support, control of the hardware and manages the virtual machine's guest operating systems.

In an embodiment, build server 110 is configured by execution of application 113 to determine a target hypervisor that can be used in the build and operation of a virtual server while the target hypervisor executes on at least one physical host server and without running on an operating system of the at least one physical host server. For example, hypervisor 140 may be identified for use as the target hypervisor because physical host server 130 does not have a host operating system thus hypervisor 140 executes without running on the operating system of physical host server 130. Therefore, hypervisor 140 would be operating as a bare metal hypervisor (i.e., type-1). In an alternative embodiment, hypervisor 140 has a type-2 hosted architecture, which includes the target hypervisor being installed and executing on the pre-existing host operating system (not shown) of the physical host. The type-2 architecture relies on the physical host's operating system for physical resource management and device support.

In some embodiments, the build server 110 may determine that, based on non-structured strings 124 in server design data 122, virtual server 160 is to be built to handle a processing load above a pre-determined threshold. The build server 110 may also determine whether the target host (e.g., physical host server 130) comprises at least one processor that is particularly designed to allow for execution of the target hypervisor at ring-minus-one. Ring-minus-one refers to a processor privilege level one level below ring-zero. It is understood that rings are arranged by levels from most privileged (most trusted, typically at ring-zero) to least privileged (least trusted at ring-three). In an embodiment, ring-minus-one has the highest privilege of "root privilege" and hypervisor 140 is the target hypervisor that is identified to execute at ring-minus-one on the host server 130 via processor 131, thus improving the functioning of at least the corresponding virtual server to be built (e.g., 150, or 160). This is because the virtual server's guest operating system (e.g., one of OS images 182) can execute at a privilege level of ring-zero without additional overhead of binary translation or modification to the guest operating system of a virtual server, and thus does not conflict with hypervisor 140 executing at the different level of ring-minus-one on the physical host server 130. Thus, some embodiments may determine that hypervisor 140 should be the target hypervisor that will execute at ring-minus-one of the host server 130 via a processor (e.g., 131) and the build server 110 may generate server configuration parameters 115 to include this determination. In an alternative embodiment, application 113 determines that the target hypervisor is to reside and execute at ring-zero because the host server may not have hardware (e.g., a processor or other resources) that allow for the target hypervisor to reside and execute at ring-minus-one. Thus in this alternative embodiment, the ring-zero may correspond with the highest privilege ring level having root privilege to the kernel of a CPU on the host server. The build server 110 may generate server configuration parameters 115 which comprise specifications about the processor and memory of a physical host server, and determinations as to whether or not the target hypervisor will execute at ring-minus-one of the host server.

In both build mode and precheck mode, the build server 110 may generate and verify server configuration parameters 115 based on the server design data 122 and non-structured strings 124. In some embodiments, sever configuration parameters 115 may be generated using the translation table 114. The application 113 may generate some of the server configuration parameters 115 by taking inputs of non-structured strings 124, capitalize the first three characters, letters, values, and/or symbols of the non-structured strings 124, pull a comparison value from memory 112, and correlate the first three capitalized portion with pre-defined types of parameters that may be used to build a new server. For example, the build server 110 may determine a user group from a plurality of user groups 183 based on a login identifier and/or email address stored in the server design data 122, where the user group includes the group of user accounts enabled with specific permissions (authentication packets) to use a collection of servers at a specified location. The determination of the user group that will be stored in the server configuration parameters 115 may be associated with the build of the new server, such as virtual server 160.

Another parameter that may be generated within the server configuration parameters 115 includes an environment type parameter. The application 113 may configure the build server 110 to determine an environment type that the virtual server 160 will be operating in once built, and the environment type may correspond with "production", "test", or "development". The environment type affects how the virtual server (e.g., 160) will be provisioned during the build and the processing reliability specified when that virtual server is used. In some embodiments, the environment type parameter corresponding to "production" may be allocated more hardware or software resources than that of "testing" or "development". Data stored as non-structured strings 124 may not be consistent between multiple instances of server design data 122 or with the server configuration parameters 115 that are used to provision a new virtual server (e.g., 160).

For example, different instances of server design data 122 may include non-structured strings 124 that have one of "BreakFix", "Break Fix", "BF", "B/F", and "Test 1" that was input by at least one UE 102 and stored in a free text field via ticketing tool 126. Each of these non-structured strings may be translated by application 113 via translation table 114 into the same environment type parameter of "test" and included in server configuration parameters 115. This may be in contrast to a generic computer that may return errors due to its inability to understand all of the variations of non-structured strings, and thus the present disclosure may improve the functioning of the particular computer systems involved because hard-coding each possibility into memory is avoided, which thereby may decrease memory usage, improve processor efficiency, and increase the amount of servers that are built in an allotted time.

The generation of server configuration parameters 115 may include designation of the target datacenter that is determined based on the association with the target host, such as the physical host server 130. The build server 110 may also identify and verify the target platform that is the guest operating system for the virtual server, which may be associated with a third-party operating system. This may include the build server 110 determining that the non-structured strings 124 are associated with one of the operating system (OS) images 182 (e.g., a third-party operating system such as WINDOWS, LINUX, etc.) stored and retrievable from build data store 180. The server configuration parameters 115 may also include definitions for OS tools 181 that correspond with the determined OS image that will be used for the new virtual server 160. The build server 110 may be configured by application 113 to implement a script that identifies which OS tools 181 and software packages 185 will be installed and used on the new virtual server 160 subsequent to it being built, and may retrieve the corresponding OS tools 181, one of the OS images 182, and a set of software packages 185 from build datastore 180. The list of OS tools 181, OS images 182, and software packages 185 may be based on the target datacenter and/or environment type parameter contained in the server configuration parameters 115. Values from the non-structured strings 124 may be used to generate definitions for the OS tools 181 and software packages 185 that will be used for the new virtual server that may be built.

In some embodiments, the application 113 may interact with the ticketing system 120, virtualization management server 190, build datastore 180, and/or physical host server 130 (along with its hypervisor 140) by dynamically triggering scripts in multiple programming languages such that the server configuration parameters 115 may be implemented to verify and/or build a new server (e.g., 160) in a manner that is consistent with the programming language understandable to the target hypervisor, e.g., 140. To verify that the virtual server 160 can function within the resource allocations permitted by hypervisor 140, the build server 110 may be configured by application 113 to generate server configuration parameters 115 based on determination about memory allocation and the amount of processing resources available to the virtual machine, such as CPU count (i.e., the amount of CPU cores that correspond with virtual processing ability for a virtual server). When the build server 110 identifies the target hypervisor to be hypervisor 140, the application 113 may configure build server 110 to verify that the memory allocation in the server design data 122 is greater than a calculated threshold and less than a maximum memory size.

For example, the calculated threshold may be 1023 megabytes and the maximum memory size may correspond with that of the memory available for use by physical host server 130 and be allocated as virtual memory to virtual server 160. The maximum memory size may be reported by the hypervisor 140 via virtualization management server 190. If the maximum memory size is less than the calculated threshold, then the build server 110 may log this and return a message to UE 102 describing the possible issues that may occur should a build of the new server proceed. In some embodiments, the maximum memory size may be any amount greater than the calculated threshold and less than ten gigabyte, one hundred gigabyte, a terabyte, or one hundred terabytes. In some embodiments, the non-structured strings 124 of server design data 122 may include a memory allocation that is given in gigabytes instead of megabytes. In this embodiment, the application 113 may translate the memory allocation to megabytes via translation table 114 prior to being stored as a server configuration parameter 115. In some embodiments, the application 113 determines the intended CPU count from the server design data 122 and verifies that it is less than or equal to a maximum CPU count available for the virtual server, where the maximum is specified by the target hypervisor, such as hypervisor 140 for virtual server 160. In an embodiment, the maximum CPU count for virtual server 160 is greater than zero and less than one hundred. Thus the generation of server configuration parameters 115 is based on the determination that the CPU count in the server design data 122 is no more than a maximum CPU count pulled from hypervisor 140.

In some embodiments, the server configuration parameters 115 may store the outcome of the determination for the primary virtual network interface controller made by the build server 110 via configuration by application 113 and ratings engine 116. The application 113 may validate that the corresponding virtual server 160 is able to be built by validating the virtual port group of the virtual switch 142. Each virtual network interface controller may be associated with a port group of the virtual switch 142, such as port group 144, 146. For example, port group 144 may correspond to a "test" group and port group 146 may correspond to a "production" group. Based on the determination that virtual network interface controller 161 is the primary virtual network interface controller for use by the virtual server 160, the application 113 configures the build server 110 to verify that a virtual port of the port group 146 exists and/or is available on the virtual switch 142. As illustrated in FIG. 1, virtual network interface controllers 162, 163 are associated with virtual server 160 and correspond with virtual ports in port group 144, along with virtual network interface controller 152 associated with virtual server 150. In an embodiment, build server 110 may determine that primary virtual network interface controller 161 corresponds with "production", and thus verifies that port group 146 exists and corresponds with the "production" port group. Validation that a port group (e.g., one of 144,146) exists and at least one virtual port corresponds with the primary virtual network interface controller 161, the build server 110 may log this and include it with a report sent to UE 102 at a designated time.

In embodiments where the build flag corresponds with build mode or precheck mode, the application 113 may also verify details about the network design and storage for the new server. The application 113 may verify that the virtual server 160 and corresponding virtual network interface controllers 161, 162, 163 are assigned appropriate network settings such as IP addresses and subnet masks, while the primary virtual network interface controller 161 may be verified that it is assigned a primary gateway on the virtual switch 142 and that virtual switch 142 includes the port groups 144, 146 that will be used by virtual server 160 after it is built and put into operation.

The build server 110 may generate server configuration parameters 115 to include information about design storage data based on values obtained from the target hypervisor (e.g., 140). In some embodiments, the server design data 122 may not comprise all of the configurations to ensure that the new server will operate without conflicting with existing file systems and volume on virtual memory. The creation of a new server (e.g., 160) may use a number of file systems that are already available on one or more storage devices (e.g., memory 132 or other remote repositories for hosting and use by virtual machines) and the build server 110 may be configured to verify that conflicts and storage errors are avoided. The application 113 may configure build server 110 to obtain a unique list of volume names that correspond with partitions of storage devices available to hypervisor 140. For each volume name in the list, the application 113 may concatenate and aggregate the file system sizes to account for how many, and the size, of storage disks to be created for use by the new virtual server (e.g., 160). The design storage data may be one of many definitions for the OS image 182 and OS tools 181 that provision the virtual machine with specifications based on the setup and structure of file systems that will be operating on the new virtual server. The application 113 may autonomously generate an output script of virtual disks to be created based on the concatenated and aggregated file system sizes, where the output script corresponds with one virtual disk that will be created per unique volume name comprised in the output script. In an embodiment, the application 113 may isolate and remove one or more volume names from the output script based on that volume name already being used (or allocated for use) by another virtual server to be built or already in operation.

Any issues identified by the build server 110 via application 113, virtualization management server 190 and/or hypervisor 140, may be added to a log, and the application 113 may configure processor 111 to increment an issue counter based on the number of issues or possible issues that will or may occur should the build of the new virtual server (e.g., 160) proceed. In some embodiments, if the build flag is identified as corresponding to precheck mode, then the implementation of automatically building the virtual server 160 may not immediately proceed. This allows for the server design data 122 to be autonomously validated before any changes are made to the cloud environment that the virtual server will be operating within. If the build flag is identified as corresponding to build mode, the build server 110 may continue to implement and/or continue activation one of the unique locks 184 against the target hypervisor (e.g., 140). In some embodiments, the application 113 may determine that the build flag corresponds with build mode and may build the virtual server 160 based on the server configuration parameters 115 and the primary virtual network interface controller 161. The build server 110 may be configured by application 113 to call a script to automatically build the server based on the server configuration parameters 115 and the primary virtual network interface controller (e.g., primary virtual Network interface controller 161 for virtual server 160).

The building of a new server (e.g., virtual server 160) may include creation and provisioning of a virtual machine using the target hypervisor (e.g., 140). The build of the new server may include installation of the OS image (one of OS images 182) as previously determined and provisioned with server configuration parameters 115. The build of the new virtual server (e.g., 160) by build server 110 may also include creating a volume group comprising the virtual disks for storage based on the output script comprising unique volume names. The build of the new server (e.g., 160) may also include the creation of file systems and folder structure within the virtual server and setting permissions based on the application identifiers of the software packages 185 and OS tools 181 that are or will be installed on the virtual server 160. In an embodiment, once the new server (e.g., 160) is built and the OS image is installed, the build server 110 may be configured by application 113 to release the unique lock on the target hypervisor (e.g., 140) and thus allow other builds to proceed for other new servers. Once the unique lock is released, the configuration of the newly built virtual server (e.g., 160) may proceed without the unique lock being implemented and/or active against the target hypervisor.

In some embodiments, the application 113 may institute a processing hold that instructs the build server 110 to wait a period of time before installing the set of software packages 185 previously identified. This allows for validation that the newly built virtual server 160 is recognized and accessible to a software tool (occasionally referred to as automation tool) used in the build of the new server (e.g., a tool of application 113 or a third party software tool) and thus helps to ensure the connectivity of the newly built server (e.g., 160). If the period of time passes without the build server 110 validating that the newly built server 160 exists and appears to the automation tool, then the build server 110 may trigger a communication test via hypervisor 140 and/or primary network interface controller 161 to initiate (or in some embodiments force start) the connectivity of new server 160 and then ensure that it can be seen by the automation tool.

Once the newly built server 160 has been identified in the automation tool, in some embodiments the application 113 may configure the build server 110 to retrieve assigned operational values for the customer (e.g., corresponding to the name of user accounts using the new server) and environment (e.g., "test", "production", "development") and verify that they are not over allocated or assigned to another virtual server already in use. If these customer and environment values remain available and were not over allocated, then they may be propagated into the automation tool by the application 113. The application 113 may configure the build server 110 to install the determined OS tools 181 and set of software packages 185 previously determined, and in some embodiments this may occur in response to release of the unique lock. The application 113 may ensure that the automation tool shows all of the software packages 185 in the set as being installed. In some embodiments, the application 113 may instruct hypervisor 140 to add one or more virtual network interface controllers to the newly built virtual server 160. The additional virtual network interface controllers may not replace the primary virtual network interface controller previously determined. For example, the virtual network interface controller 163 may be added at a later time, while virtual network interface controller 161 remains the primary for virtual server 160. Server configuration parameters 115 may be called to configure the newly added virtual network interface controller inside the guest operating system of the virtual server (i.e., the operating system installed from the OS image).

In an embodiment, the application 113 autonomously generates a summary email that comprises a list of any issues that occurs during the build of the new server, a log listing all build steps and verification steps performed, and a design summary that may comprise at least some of the server configuration parameters 115 at the bottom of the email. In some embodiments, the build server 110 may be configured by application 113 to activate virtual server 160 for use and implement virtual server 160 for its intended operation on the virtual network 119 and network 118, thereby improving the functioning of the cloud environment through the addition of additional processing resources and decreasing the burden that may have been placed on resources previously in operation.

Figure 2:
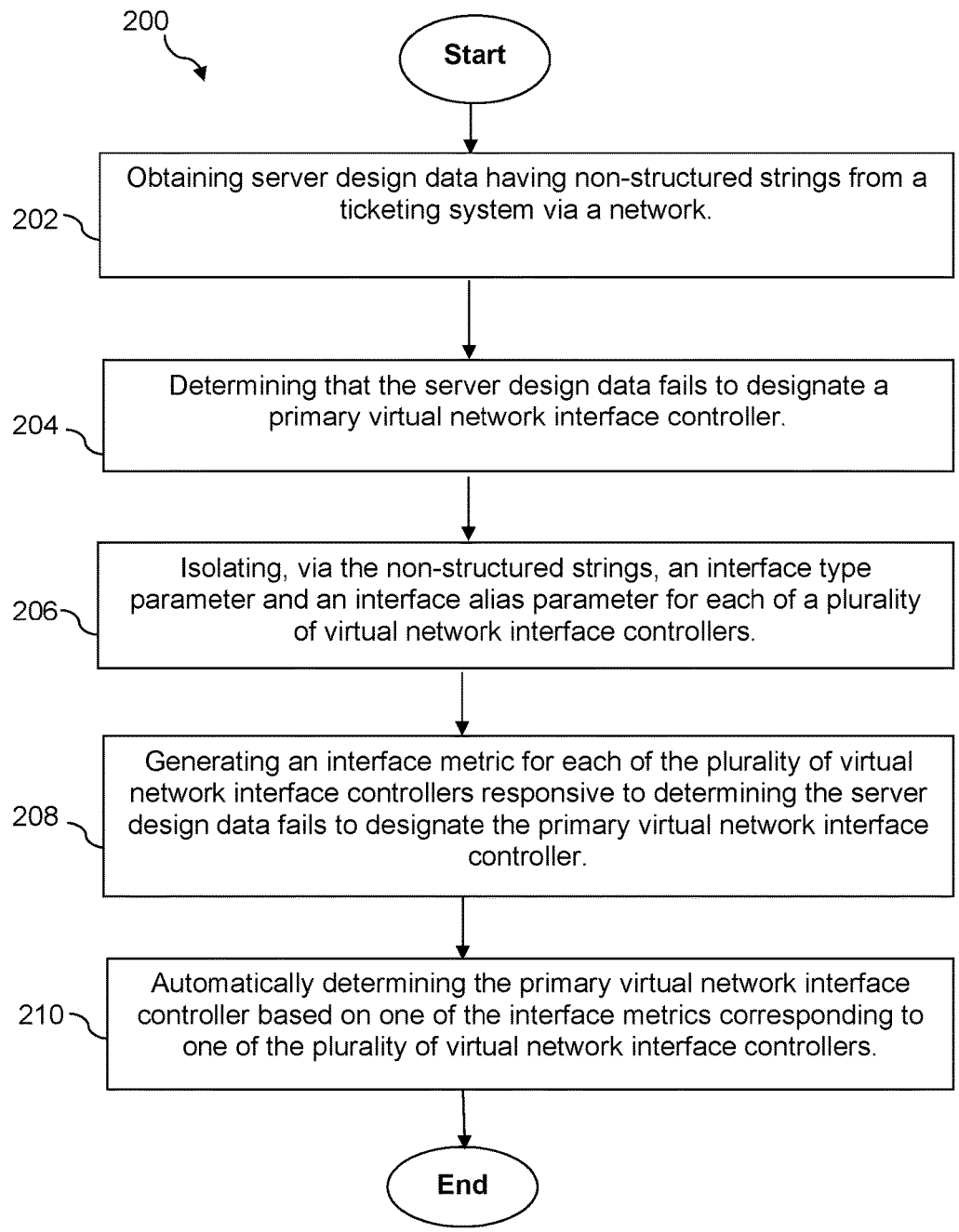
FIG. 2 is a flow chart of a method according to an embodiment of the disclosure.

Turning now to FIG. 2 with occasional reference to FIG. 1, a method 200 is described according to an embodiment. In some embodiments, the communication system 100 may be configured to implement embodiments of method 200 disclosed herein. At block 202, a build server comprising at least one processor and non-transitory memory obtains server design data from a ticketing system via a network. The server design data comprises non-structured data, such as non-structured strings. Further explanation regarding the challenges in using non-structured data, such as non-structured strings, may be helpful and is intended to be in addition to the discussion described above with respect to FIG. 1.

It is understood that non-structured data differs from structured data and the present disclosure may address problems and technical challenges that are inextricably tied to technology due to the nature of non-structured data. Structured data may depend on creating a data model, which is a model of the types of data that will be recorded and how they will be stored, processed, and accessed. Structured data corresponds with pre-defined fields that data will be stored in and restrictions on the data input (e.g., number of characters, restriction of terms, syntax, etc.) in the fields.

For example, when a user goes to a travel website to book a flight, the fields corresponding to structured data may include departure location, arrival location, departure and arrival dates, and so forth. The information from a structured data model may be easily entered (e.g., by user input that is predefined in a drop-down menu), stored, queried, and analyzed because the fields may be completely pre-defined through tags and only certain input may be accepted that must meet the rules for the structured data field. This means that inputs through structured data are limited and may not account for all aspects of what might be useful to build a server and the corresponding structured data model may not adequately be hard-coded with all of the pre-defined fields having the exact number and sequence of input in proper format. In contrast, unstructured data may include types of data that may not necessarily be easily identifiable or labeled in a predictable manner for a generic machine to use and recognize. In some embodiments, non-structured data includes strings of free-form text, untagged and/or mislabeled fields, word processing documents, portable document format (PDF) files, photo files and graphics images, streaming network data, data in a ticketing system, emails, or any combination thereof. In some embodiments, the use of the term non-structured data and/or non-structured strings includes the use of one or more fields with a tag or marker, but the fields lack a data model and the tag or marker does not uniformly identify all of the information and elements within the field because of the use of non-structured strings. Thus, the non-structured strings of the server design data may be received from user equipment, and may correspond with user input that is not predefined in a drop-down menu because a drop-down menu would be a type of structured data.

For example, a ticketing tool (e.g., 126) may be accessed by user equipment (e.g., 102) and non-structured strings 124 are input into a field corresponding to server design data 122. The field storing the non-structured strings 124 may have a tag, or other metadata, that includes information tangential to the content within the field (e.g., the email address, software version number, and/or date of creation), but at least some of the data in the field is non-structured text that does not conform to a uniform data model and is not identified by the tag. By way of another example, the server design data 122 may comprise a field with a tag marked as "DMZ" (which stands for Demilitarized Zone in a network), yet the non-structured strings (i.e., non-structured data) stored within the field may be describing other information that includes settings about a network, information for a new server, and/or parameters for a virtual network interface controller such as an interface type parameter and an interface alias parameter. Moreover, the non-structured data (e.g., non-structured strings) that is comprised within one or more fields of the server design data may be in multiple formats, such as strings of text, values in dotted quad format (e.g., 198.163.0.02), Boolean operators and operands, phrases, clauses, and/or sentences which (in some embodiments) may be conversational in nature. Thus, a generic computer system may return errors due to the conflicting formats and lack of overall structure in the non-structured data. Thus, embodiments of the present disclosure provide for accessing a database of the ticketing system via a network to obtain server design data having non-structured strings, and then using the non-structured strings as input in the process of verifying and building a new virtual server.

At block 204, the method 200 includes determining that the server design data fails to designate a primary virtual network interface controller. In some embodiments, the build server 110 is configured by application 113 to make this determination based on parsing the non-structured strings. The build server 110 may create a translation table for the non-structured strings and parse the non-structured strings in the translation table. For example, this may comprise parsing the server design data and discovering that it includes non-structured data (e.g., non-structured strings), that the fields do not have a tag for primary virtual network interface controllers, and/or that the non-structured strings in the server design data do not identify a primary virtual network interface controller. Additionally, the server design data may comprise a build flag and the method may include the build server determining that the build flag in the server design data corresponds with at least one of a permission to build a virtual server and/or a permission to verify that a virtual server can be built.

At block 206, the method continues by the build server isolating, via the non-structured string, an interface type parameter and an interface alias parameter for each of a plurality of virtual network interface controllers. For example, the build server may determine that the non-structured strings are associated with a plurality of virtual network interface controllers based on parameters known to the build server from a lookup table. From within the non-structured strings, the build server may isolate specific data and in some embodiments may selectively extract it, and place it in a translation table for additional analysis. Each virtual network interface controller used by a virtual server (once built) may have its own interface type parameter and interface alias parameter, such as discussed with respect to FIG. 1.

At block 208, the method continues by generating an interface metric for each of the plurality of virtual network interface controllers. In some embodiments, the build server generates each interface metric, and the generation may be responsive to and/or based on determining that the server design data fails to designate the primary virtual network interface controller. The generation of interface metrics, each corresponding to one of the plurality of virtual network interface controllers, may be based on the interface type parameter and interface alias parameter corresponding to that virtual network interface controller. For example, the build server may determine that the server design data may be associated with at least one of five separate virtual network interface controllers based on analysis of the non-structured strings. Thus, a separate interface metric would be generated for each of the five virtual network interface controllers and it may be based on at least one their corresponding interface type parameter and interface alias parameter.

At block 210, the method includes automatically determining the primary virtual network interface controller based on at least one of the interface metrics corresponding to one of the plurality of virtual network interface controllers. Stated simply, from among the plurality of virtual network interface controllers, only one may be selected as the primary one, and the build server may automatically determine which one should be the primary based on the interface metric for each virtual network interface controller. The build server may accomplish this in an autonomous manner and thus improve the functioning of the network by improving the speed with which a virtual server may be verified, built, and/or implemented on the network.

In some embodiments, the method 200 includes identifying a target hypervisor based on the determination of the primary virtual network interface controller. For example, the build server may determine that the primary virtual network interface controller corresponds with a host server that can handle execution of a hypervisor that executes at a particular ring level, such as ring-minus-one or ring-zero. Thus, in some embodiments, the build server identifies a hypervisor instance that executes at ring-minus-one to become the target hypervisor for the virtual server that will use the primary virtual network interface controller upon being built. The method may include automatically feeding the determination of the primary virtual network interface controller to the target hypervisor. In some embodiments where a build flag in the server design data is determined to correspond with permission to build a virtual server, the method may also include implementing a unique lock against the target hypervisor. The implementation and/or activation of the unique lock may occur prior to and during the building of the virtual server, and may be released after the virtual server is built but before it is completely provisioned for use on a physical and/or virtual network.

In some embodiments, the method 200 includes generating server configuration parameters from at least the server design data. This may be based on use of a translation table. A build server may determine that a memory allocation in the server design data is greater than a calculated threshold, such as 1023 megabytes, and less than a maximum memory size, such as the maximum memory capacity allocated for use by a hypervisor and virtual servers. A build server may also determine that the server design data, via the non-structured strings, corresponds with a CPU count that is less than or equal to (i.e., no more than) a maximum CPU count that is a ceiling allocated for use by a hypervisor. This may ensure that the physical host server and/or corresponding hypervisor is able to accommodate the computing loads that may be seen by the virtual server if and when it is built and put into operation. The generating of server configuration parameters may be based on these determinations related to maximum CPU count and maximum memory. In an embodiment, server configuration parameters include definitions for operating system tools and/or an operating system image, identification of the operating system image that will be used on the virtual server should it be built, and/or selection of software payloads (i.e., a set of software packages identified from a plurality in a database) that will be installed subsequent to a virtual server being built.

In some embodiments, the method 200 may also include building a virtual server via the use of a target hypervisor that configures hardware resources of one or more physical host servers. The building of the virtual server may include creation of a virtual machine based on the server configuration parameters and the primary virtual network interface controller.

Figure 3A:
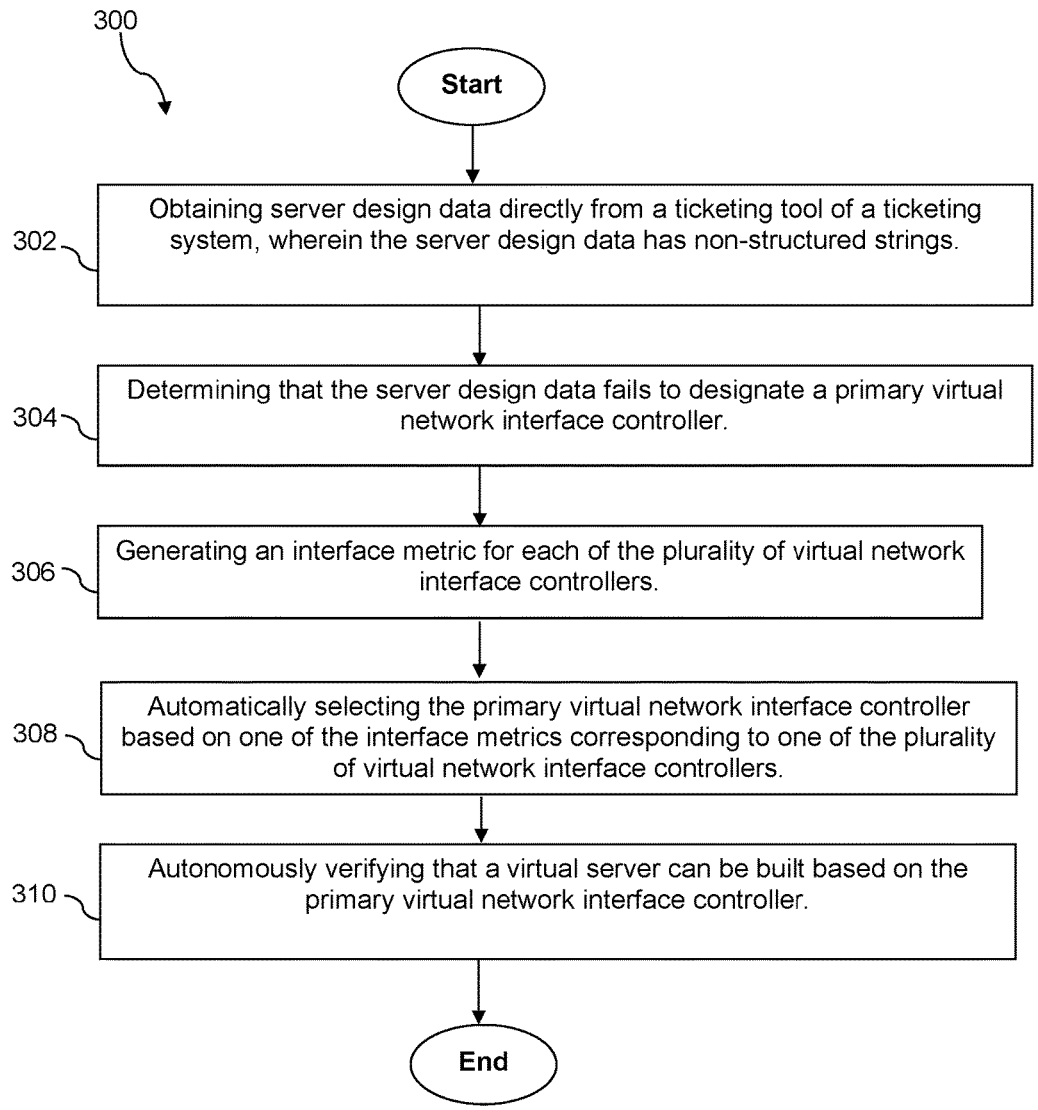
FIG. 3A is a flow chart of another method according to an embodiment of the disclosure.
Figure 3B:
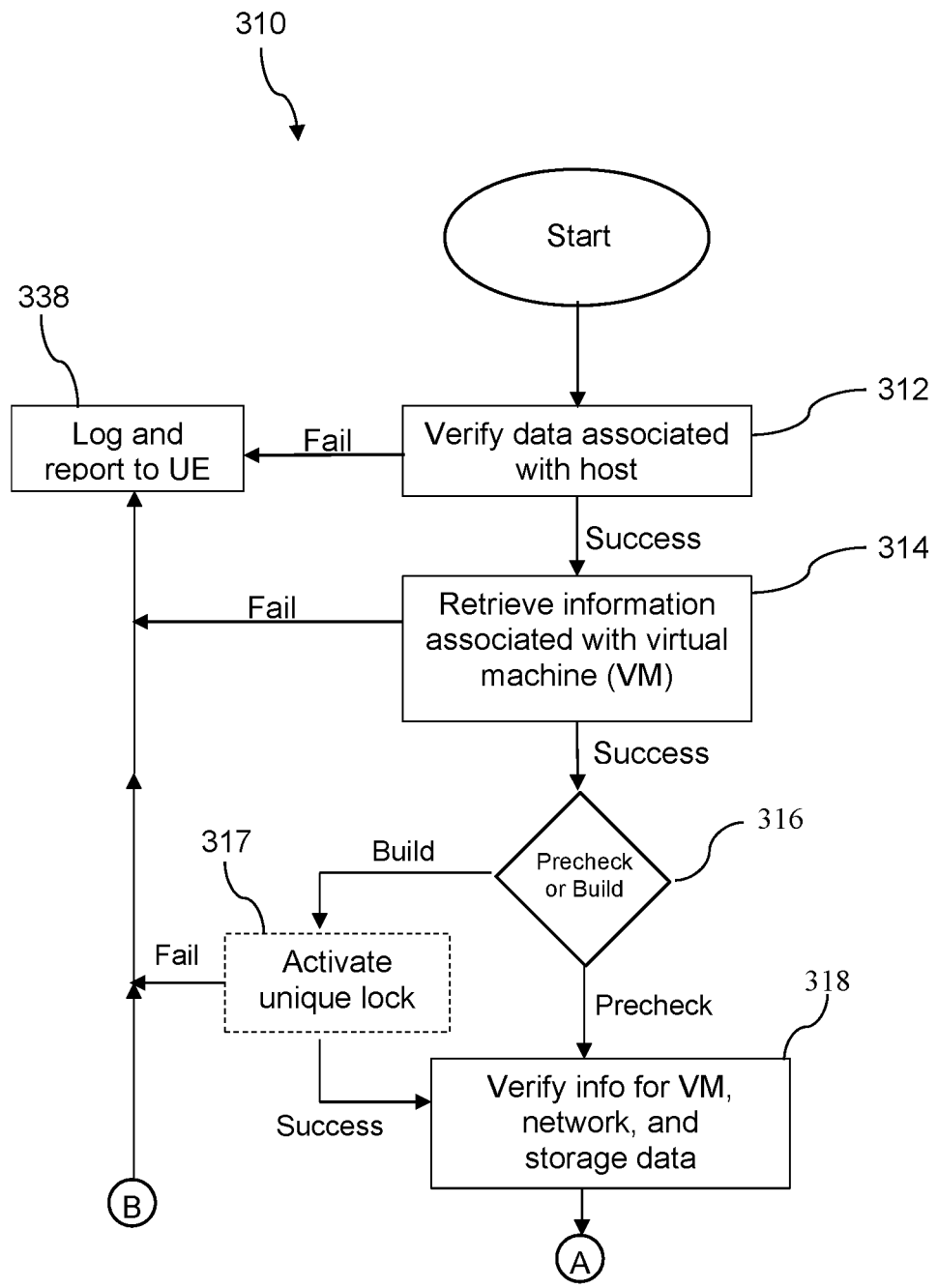
FIGS. 3B and 3C illustrate a chart of a messaging flow according to an embodiment of the disclosure.
Figure 3C:
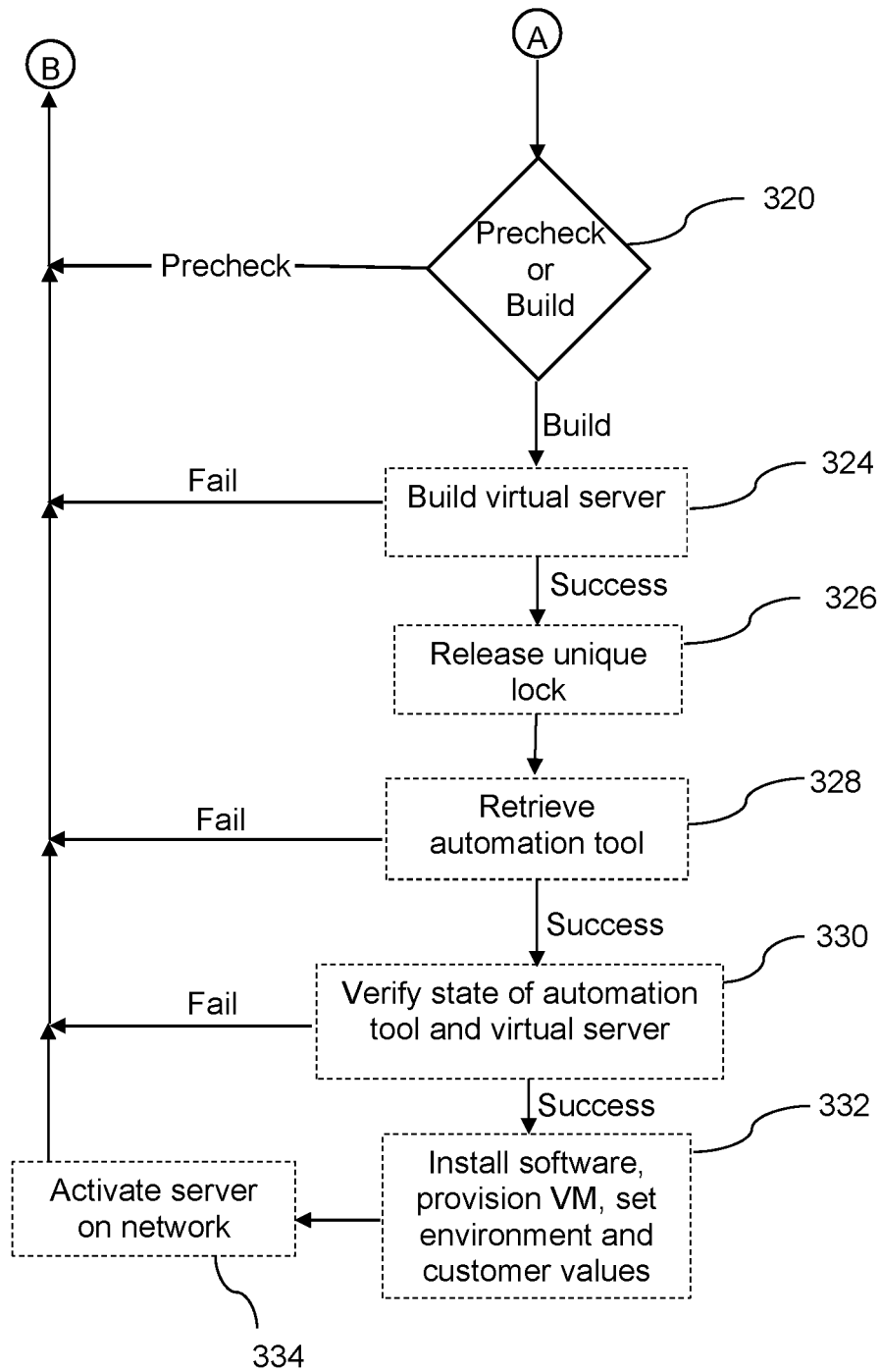

Turning now to FIG. 3A, a method 300 is described according to an embodiment with reference to FIGS. 3B and 3C. Beginning at block 302, the method 300 includes obtaining server design data from a ticketing tool of a ticketing system. For example, a build server may execute an application stored in non-transitory memory that configures a processor and autonomously accesses a corporate ticketing system, such as a service manager database as discussed in FIG. 1. The server design data includes non-structured strings.

At block 304, the method 300 continues by the build server determining that the server design data fails to designate a primary virtual network interface controller. For example, the non-structured strings may not correspond with a structured data model, nor do they correspond with a tag in a field of the server design data that is associated with indicating which virtual network interface controller should be the primary.

At block 306, the method 300 further includes generating an interface metric for each of a plurality of virtual network interface controllers. In some embodiments, the interface metrics may be generated by the build server and may be based on and/or in response to determining that the server design data fails to designate a primary virtual network interface controller. In an embodiment, generating at least one of the interface metrics comprises creating a translation table, extracting non-structured strings comprising an interface type parameter and an interface alias parameter from the server design data into the translation table, determining that at least some of the non-structured strings correspond with virtual network interface controllers, and allocating a value to the interface metric for the virtual network interface controller based on the interface type parameter and the interface alias parameter.

At block 308, the method 300 continues with the build server automatically selecting a primary virtual network interface controller based on at least one of the interface metrics that corresponds to one of the plurality of virtual network interface controllers. In some embodiments, the build server may generate a mapping of the primary virtual network interface controller to a virtual switch of the target hypervisor. The mapping may be included in a log that is reported to a user equipment. In some embodiments, the build server may push the mapping to the target hypervisor to confirm that the mapping would be accepted and work should the virtual server be built and put into operation.

The method 300 continues at block 310 by the build server autonomously verifying that a virtual server can be built. In some embodiments this may be based on the primary virtual network interface controller that was automatically selected despite the lack of designation in the server design data. The autonomous verification may be in response to identifying that a build flag in the server design data corresponds to at least one of precheck mode or build mode. With reference to FIGS. 3B and 3C, a chart of a messaging flow is disclosed for at least one embodiment of autonomous verification from block 310.

At block 312 of FIG. 3B, a build server verifies data associated with a host, which is at least one physical host server that may be associated with the building and/or running of the new virtual server once built. This may include parsing and interpreting at least some of the non-structured strings in server design data. In some embodiments, verifying that a virtual server can be built includes determining an environment type and target platform for the virtual server based on the non-structured strings. As discussed with reference to FIG. 1, the environment type may correspond with "test", "production", or "development" and the target platform may correspond with a guest operating system will be running on the virtual server. The build server may identify an operating system image corresponding to the target platform. Additionally, the build server may determine a set of operating system tools and/or a set of software packages for installation on the virtual server based on the environment type and target platform. A build server may generate server configuration parameters that define configurations for the virtual server, list where the parameters used for building the server are stored, and log whether they are compatible with hardware and software resources within the operating network. In the event an issue or error is found in verifying data about the server design, the process may log and report any issues to a user equipment. In some embodiments, the verification process will continue while also continuously and/or periodically logging and reporting any issues that arise and the successful verifications that take place.

At block 314, a build server may retrieve information associated with operations of a virtual machine. For example, the build server may obtain information about available hypervisor instances, determine a target hypervisor that may be used to build and provision the new virtual server once built, and check for whether the server design data meets minimum and maximum memory and/or processing thresholds for the hypervisor. At block 316, the build server makes a decision about whether the process should proceed with build mode or precheck mode. It is understood that in some embodiments, the identification of build mode or precheck mode may occur in an alternative sequence and autonomous verification may be in response to identifying the state of the build flag. The build server may identify whether a build flag in server design data is yes or no, where yes corresponds with build mode and no corresponds with precheck mode, where a unique lock is not activated or implemented. In an alternative embodiment, the build flag corresponds to build mode and at block 317 the build server retrieves a unique lock and activates. In precheck mode, the autonomous verification process may continue at block 318 where the build server verifies information for the virtual server by checking that settings for the network and storage data that will be used by the virtual server.

At block 320, the build server may aggregate the server confirmation parameters and any issues that might occur should the build of the new server go forward, thus allowing for the server design to be validated before any changes are made to the operating environment that the virtual server will be operating within. This information may be reported to user equipment, and the build server may request confirmation whether a build should proceed should there be no issues present.

In an alternative embodiment where the build server receives confirmation that building of the virtual server should proceed, whether it be via a build flag or other input, at block 324 the build server may ensure that a unique lock is activated against the target hypervisor and build the virtual server based on the information and server configuration parameters that were autonomously verified. The build server may install the operating system image corresponding to the target platform and release the unique lock as shown in block 326. At block 328 the build server may retrieve and/or access an automation tool and at block 330 may verify the state of the automation tool and virtual server by determining whether the newly built virtual server is accessible to the automation tool via a network and the target hypervisor. At block 332, the build server may install a set of software packages, provision the virtual server with server configuration parameters, and set customer values and environment values, as discussed with reference to FIG. 1. In some embodiments, the method 300 may continue with the virtual server being activated on the network and a summary of the build operations and any issues may be logged and sent to user equipment.

Figure 4:
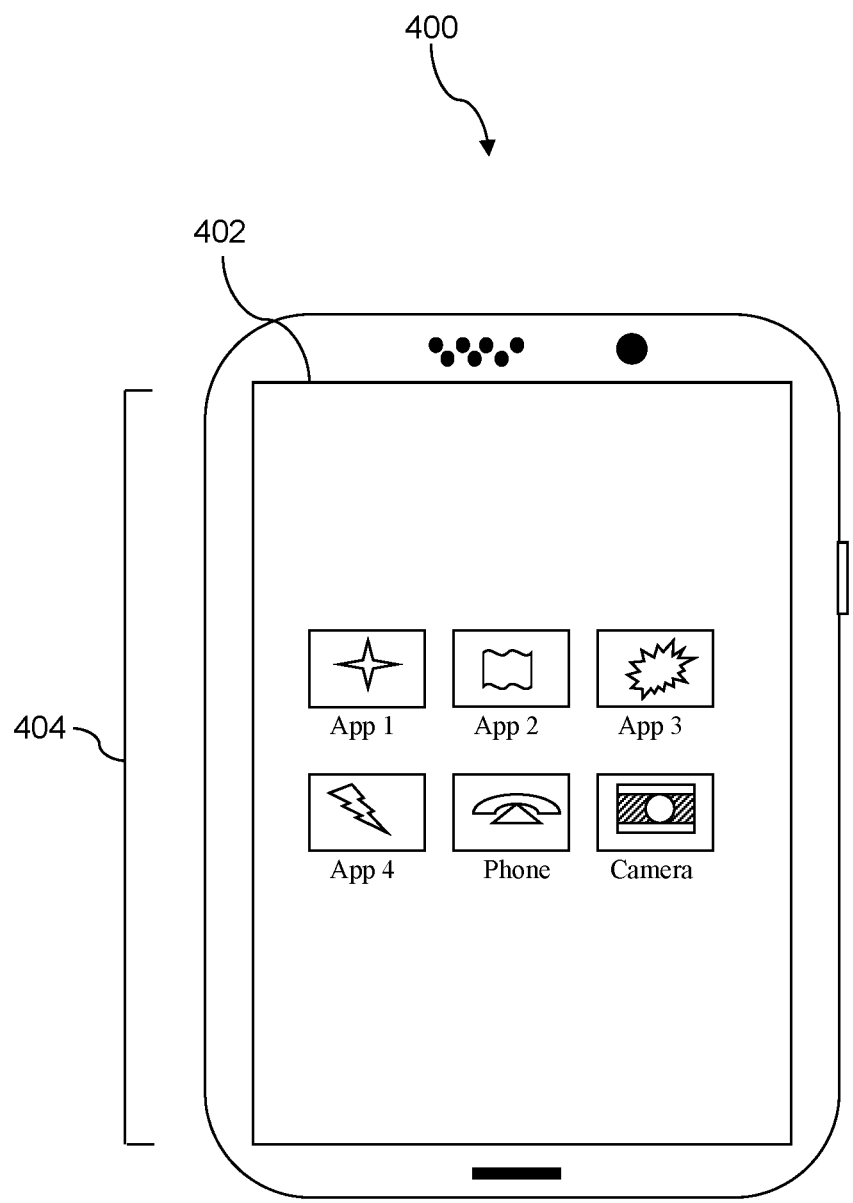
FIG. 4 illustrates an embodiment of user equipment according to the disclosure.

FIG. 4 depicts the user equipment (UE) 400, which is operable for implementing aspects of the present disclosure, but the present disclosure should not be limited to these implementations. For example, UE 400 discussed herein may be embodiments of UE 102 illustrated in FIG. 1. Though illustrated as a mobile phone, a UE (e.g., 400) may take various forms including a wireless handset, server computer, a desktop computer, a laptop computer, a notebook computer, a tablet computer, a mobile phone, a personal digital assistant (PDA), a media player, a headset computer, a wearable computer, a game console, an Internet digital media streaming device, a television, or another network/communications capable device. The UE 400 may include a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page, access a web service, such as access a remotely executing application (e.g., ticketing tool 126 executing on ticketing system 120). The web page or may be obtained via wireless communications with an eNB, a wireless network access node, a wired communication link, a second UE or any other network (e.g., network 118).

Figure 5:
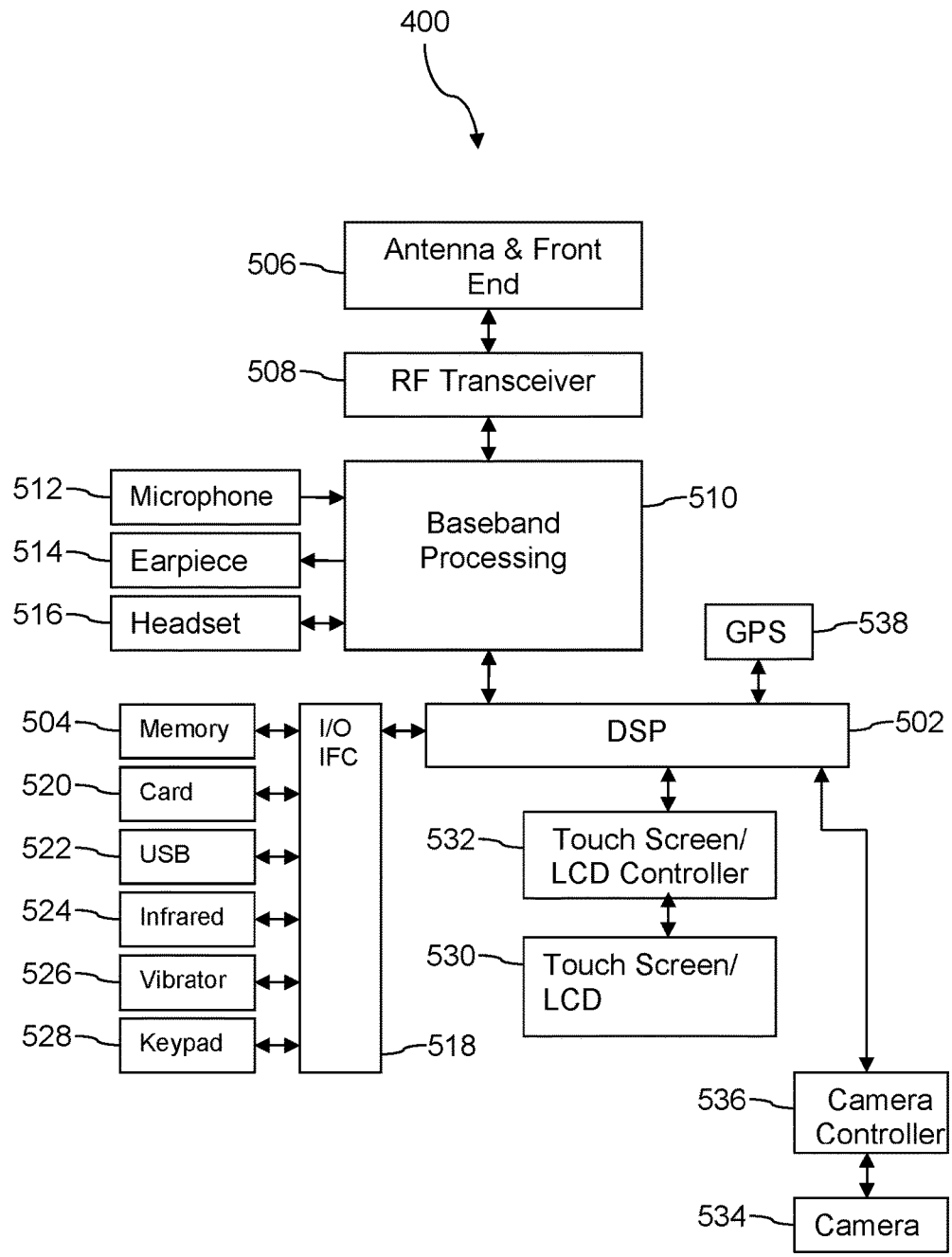
FIG. 5 is a block diagram of a user equipment according to an embodiment of the disclosure.

FIG. 5 shows a block diagram of the UE 400. While a variety of known components comprised in user equipment are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508 (which includes long-range and short range components), a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, one or more camera 534 (coupled to a surface), a camera controller 536, and a global positioning system (GPS) receiver 538. In an embodiment, the UE 400 may include another kind of display that does not provide a touch sensitive screen and/or provides gesture controls through the plurality of elements discussed herein. In an embodiment, the UE 400 may include both the touch screen display 530 and additional display component that does not provide a touch sensitive screen. The touch screen display 530 includes touch screen 402. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer, network element, or other computer system. The infrared port 524 and other optional ports such as a Bluetooth® interface or an IEEE 802.11 compliant wireless interface may enable the UE 400 to communicate wirelessly with other nearby user equipment and/or wireless node (e.g., a base station and/or eNB). In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may include a keypad and couple to the DSP 502 via the input/output interface 518 to provide one mechanism for the user to provide input to the UE 400. A keyboard may be a physical medium, virtual interface, or a combination thereof. Alternatively, one or more of the switches 528 may be coupled to a motherboard of the UE 400 and/or to components of the UE 400 via a different path (e.g., not via the input/output interface 518), for example coupled to a power control circuit (which may comprise a power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE (e.g., 102, 400) to determine its position.

Figure 6A:
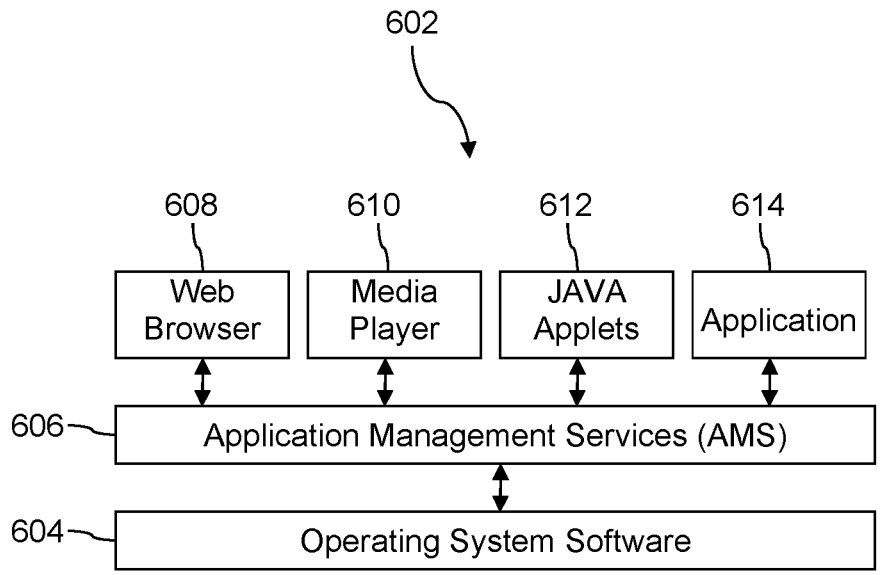
FIG. 6A is a block diagram of a software architecture for a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content of a network (e.g., 118), access a VPN service, or submit instances of information such as server design data (e.g., 122) to a ticketing system (e.g. 120) via a wired and/or wireless link. The web browser application 608 may permit user equipment to submit information (e.g., non-structured strings) into a ticketing system, view content, and select links to retrieve and view information through the browser. The web browser 608 may comprise portlets and/or applets that are provided by a server, system, and/or portal. The media player application 610 may be executed by the UE 400 to play audio or audiovisual media. The JAVA applets 612 may be executed by the UE 400 to provide a variety of functionality including games, utilities, and other functionality. In an embodiment, application 614 may provide the AMS 606 with authentication credential to access other applications (e.g., for a ticketing tool 126 of ticketing system 120), and the AMS 606 may provide mediation and communication between at least 608, 610, 612, 614 and operating system software 604.

Figure 6B:
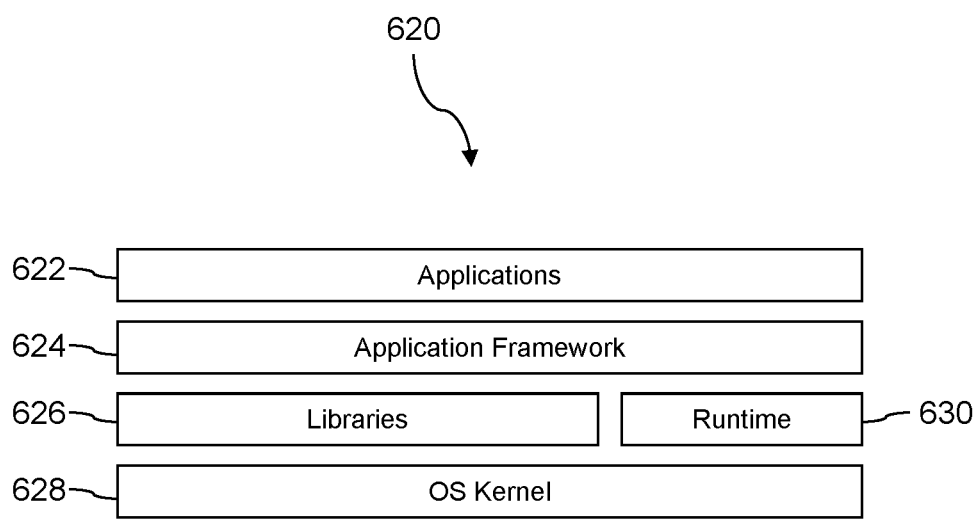
FIG. 6B is a block diagram of another software architecture with reference to FIG. 6A according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
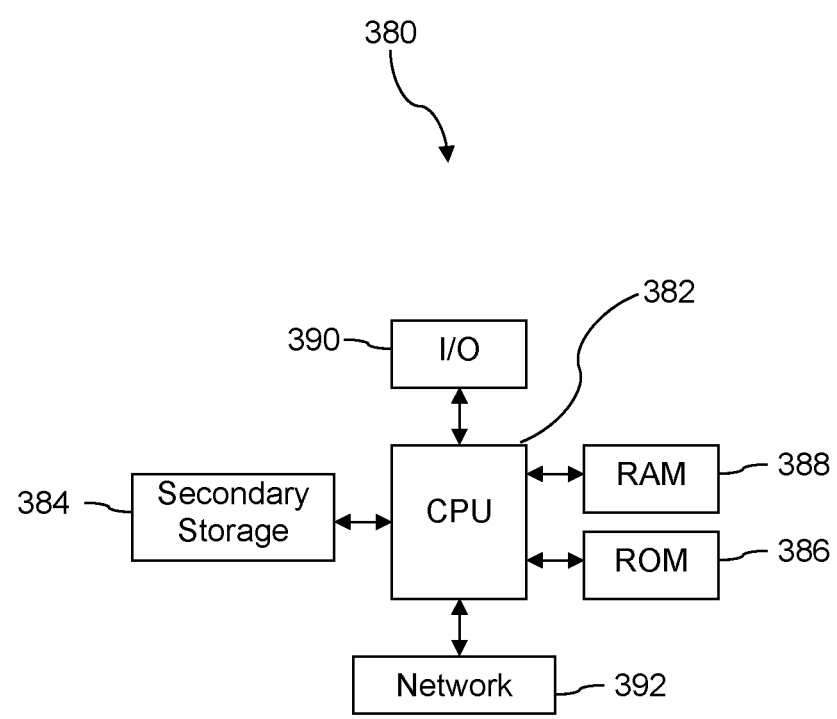
FIG. 7 illustrates an exemplary computer system suitable for implementing the several embodiments of the disclosure.

FIG. 7 illustrates a computer system 380 suitable for implementing one or more embodiments disclosed herein. For example, the computer system 380 may be used to implement any of the network components and/or elements, including a server. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementations in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer, which is a non-generic, particular machine and/or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, routers, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes, and is configured by, instructions, codes, computer programs, scripts which it accesses from hard disk, optical disk (these various disk based systems may all be considered secondary storage 384), flash drive, ROM 386, RAM 388, or the network connectivity devices 392. While only one processor 382 is shown, it is understood that any number of processors may be present and each processor may include one or more cores. Thus, while instructions may be discussed as executed by a processor, the instructions may be executed simultaneously, serially, or otherwise executed by one or multiple processors and/or cores therein through the use of threads. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software (e.g., a hypervisor) may be employed by the computer system 380 to provide the functionality of a number of servers that is not directly bound to the number of physical computers in the computer system 380. For example, virtualization software may provide twenty virtual servers on four physical host computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided via a computer program product that configures particular machines. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some networking interface, device, or intermediate component, whether electrically, mechanically, communicatively, or otherwise. Other examples of changes, substitutions, and alterations are ascertainable by one skilled in the art and could be made without departing from the spirit and scope disclosed herein.

What is claimed is:

1. A method for building virtual servers via non-structured strings, comprising:
obtaining, by a build server comprising a processor configured by an application, server design data having the non-structured strings from a ticketing system via a network;
determining, by the build server, that the server design data fails to designate a primary virtual network interface controller from a plurality of virtual network interface controllers;
in response to the determining, by the build server, that the server design data fails to designate the primary virtual network interface controller, isolating, by the build server via the non-structured strings, an interface type parameter and an interface alias parameter for each of the plurality of virtual network interface controllers;
generating, by the build server, an interface metric for the each of the plurality of virtual network interface controllers responsive to determining the server design data fails to designate the primary virtual network interface controller; and
automatically determining, by the build server, the primary virtual network interface controller based on one of the interface metrics corresponding to one of the plurality of virtual network interface controllers.

2. The method of claim 1, further comprising: identifying a target hypervisor that executes at ring-minus-one of a host server based on the determination of the primary virtual network interface controller, and automatically feeding the determination of the primary virtual network interface controller to the target hypervisor that executes at ring-minus-one of the host server.

3. The method of claim 1, wherein the generating, by the build server, the interface metric for the each of the plurality of virtual network interface controllers is based on a corresponding interface type parameter and interface alias parameter among the interface parameter and the interface alias parameter for the each of the plurality of virtual network interface controllers.

4. The method of claim 1, wherein the non-structured strings of the server design data are received from user equipment and corresponds with a user input that is not predefined in a drop-down menu.

5. The method of claim 1, further comprising:
creating a translation table for the non-structured strings;
generating server configuration parameters from the server design data based on the translation table, wherein the server configuration parameters include definitions for operating system tools, identification of an operating system image, and a selection of software payloads that will be installed subsequent to a virtual server being built; and
building the virtual server via a target hypervisor based on the server configuration parameters and the primary virtual network interface controller.

6. The method of claim 5, further comprising determining that a build flag in the server design data corresponds with permission to build the virtual server, and implementing a unique lock against the target hypervisor prior to and during the build of the virtual server.

7. The method of claim 5, wherein generating the server configuration parameters is based on determining that a memory allocation in the server design data is greater than a calculated threshold and less than a maximum memory size and that a central processing unit (CPU) count in the server design data is no more than a maximum CPU count.

8. A system for building virtual servers via non-structured strings, comprising:

a build server coupled to a plurality of host servers and a ticketing system via a network, the build server comprising:
　a processor, and
　a non-transitory memory storing an application that, upon execution, configures the processor of the build server to:
　　obtain, from the ticketing system, server design data having the non-structured strings;
　　determine that the server design data fails to designate a primary virtual network interface controller from a plurality of virtual network interface controllers based on the non-structured strings;
　　in response to the determining, by the build server, that the server design data fails to designate the primary virtual network interface controller based on the non-structured strings, isolate, via the non-structured strings, an interface type parameter and an interface alias parameter for each of the plurality of virtual network interface controllers;
　　responsive to determining the server design data fails to designate the primary virtual network interface controller, generate an interface metric for the each of the plurality of virtual network interface controllers; and
　　automatically determine the primary virtual network interface controller based on one of the interface metrics corresponding to one of the plurality of virtual network interface controllers.

9. The system of claim 8, wherein the build server is further configured by execution of the application to identify a target hypervisor that executes at ring-minus-one of a host server of the plurality of host servers based on the determination of the primary virtual network interface, and automatically feed the determination of the primary virtual network interface controller to the target hypervisor that executes at ring-minus-one of the host server.

10. The system of claim 9, wherein the generating, by the build server, the interface metric for the each of the plurality of virtual network interface controllers is based on a corresponding interface type parameter and interface alias parameter among the interface type parameter and the interface alias parameter for the each of the plurality of virtual network interface controllers.

11. The system of claim 8, wherein the non-structured strings of the server design data are received from user equipment and corresponds with a user input that is not predefined in a drop-down menu.

12. The system of claim 8, wherein the application further configures the processor of the build server to:
　create a translation table for the non-structured strings,
　generate server configuration parameters from the server design data based on the translation table, wherein the server configuration parameters include definitions for operating system tools, identification of an operating system image, and a selection of software payloads that will be installed subsequent to a virtual server being built,
　build the virtual server via a target hypervisor based on the server configuration parameters and the primary virtual network interface controller, and
　validate that the virtual server is accessible outside of a host server of the plurality of host servers only via the primary virtual network interface controller.

13. The system of claim 12, wherein the build server is further configured by execution of the application to: determine that a build flag in the server design data corresponds with a permission to build the virtual server, and implement a unique lock against the target hypervisor prior to and during the building the virtual server.

14. The system of claim 13, wherein the unique lock prevents creation of a second virtual server against the target hypervisor during the build of the virtual server, and wherein the target hypervisor executes on at least one host server of the plurality of host servers without running on an operating system of the at least one host server.

15. The system of claim 12, wherein generation of the server configuration parameters is based on determination that a memory allocation in the server design data is greater than a calculated threshold and less than a maximum memory size, and that a central processing unit (CPU) count in the server design data is no more than a maximum CPU count.

16. A method for building a plurality of virtual servers via non-structured strings, comprising:
　obtaining, by a build server executing an application stored in non-transitory memory that configures a processor, server design data from a ticketing tool of a ticketing system, wherein the server design data has the non-structured strings;
　determining, by the build server, that the server design data fails to designate a primary virtual network interface controller from a plurality of virtual network interface controllers;
　in response to the determining, by the build server, that the server design data fails to designate the primary virtual network interface controller, generating, by the build server, an interface metric for each of the plurality of virtual network interface controllers;
　automatically selecting, by the build server, the primary virtual network interface controller based on one of the interface metrics corresponding to one of the plurality of virtual network interface controllers; and
　autonomously verifying, by the build server, that a virtual server of the plurality of virtual servers can be built based on the primary virtual network interface controller.

17. The method of claim 16, wherein the autonomously verifying comprises determining an environment type and a target platform for the virtual server based on the non-structured strings, and determining a set of operating system tools for installation on the virtual server based on the environment type and the target platform.

18. The method of claim 16, wherein the autonomous verifying is in response to identifying that a build flag in the server design data corresponds to a precheck mode.

19. The method of claim 18, further comprising mapping the primary virtual network interface controller to a virtual switch of a target hypervisor.

20. The method of claim 16, wherein the generating, by the build server, the interface metric for the each of the plurality of virtual network interface controllers comprises: creating a translation table, extracting the non-structured strings comprising an interface type parameter and an interface alias parameter from the server design data into the translation table, determining that at least some of the non-structured strings corresponds with the plurality of virtual network interface controllers, and allocating a value to the interface metric for the each of the plurality of virtual network interface controllers based on the interface type parameter and the interface alias parameter.

* * * * *